United States Patent [19]
Grubert et al.

[11] Patent Number: 5,721,312
[45] Date of Patent: Feb. 24, 1998

[54] AQUEOUS POLYMER DISPERSIONS

[75] Inventors: Heinrich Grubert, Heidelberg; Rolf Dersch, Neustadt, both of Germany

[73] Assignee: BASF Aktiengesellschaft, Ludwigshafen, Germany

[21] Appl. No.: 733,852

[22] Filed: Jul. 22, 1991

[30] Foreign Application Priority Data

Jul. 30, 1990 [DE] Germany .............. 40 24 150.5

[51] Int. Cl.$^6$ ..................... C08K 5/13
[52] U.S. Cl. ............ 524/736; 524/251; 524/359; 524/394; 524/400; 524/425; 524/430; 524/433; 524/714
[58] Field of Search ................. 524/736, 359, 524/251, 394, 400, 425, 430, 433, 714

[56] References Cited

U.S. PATENT DOCUMENTS

| | | | |
|---|---|---|---|
| 3,862,066 | 1/1975 | Reiter et al. ............. | 524/728 |

FOREIGN PATENT DOCUMENTS

| | | |
|---|---|---|
| 2703977 | 1/1979 | Australia . |
| 161757 | 11/1985 | European Pat. Off. . |
| 54291 | of 0000 | France . |
| 2372178 | 6/1978 | France . |
| 2246499 | 4/1974 | Germany . |
| 2739708 | 3/1978 | Germany . |
| 2059656 | 3/1987 | Japan .............. 524/359 |

OTHER PUBLICATIONS

Patent Abstracts of Japan, 590 C–78 & JP-A-53 022585 (Kanefafuchi Kagaku k.k.k.) Mar. 2, 1978.

*Primary Examiner*—Peter D. Mulcahy
*Attorney, Agent, or Firm*—Oblon, Spivak, McClelland, Maier & Neustadt, P.C.

[57] ABSTRACT

Aqueous polymer dispersions are obtained by polymerizing a monomer mixture which contains from 10 to 100% by weight of halogenated monomers by radical emulsion polymerization in aqueous medium, adjusting the pH of the aqueous phase of the resulting aqueous polymer dispersion to from 5 to 10 by addition of bases which differ from ammonia and from primary and secondary amines, and adding from 0.005 to 1% of the weight of the monomer mixture of one or more substances from the group comprising glycerol, pivalic acid, paraldehyde, 2,6-di-tert-butyl-p-cresol, benzophenone, alkyl-substituted benzophenones, thiosulfuric acid and salts thereof, and oxalic acid and salts thereof, it being possible to add both the bases and the one or more substances before, during and/or after the emulsion polymerization.

6 Claims, No Drawings

AQUEOUS POLYMER DISPERSIONS

The present invention relates to aqueous polymer dispersions which are obtainable by polymerizing a monomer mixture which contains from 10 to 100% by weight of halogenated monomers by radical emulsion polymerization in aqueous medium, adjusting the pH of the aqueous phase of the resulting aqueous polymer dispersion to from 5 to 10 by addition of bases which differ from ammonia and from primary and secondary amines, and adding from 0.005 to 1% of the weight of the monomer mixture of one or more substances from the group comprising glycerol, pivalic acid, paraldehyde, 2,6-di-tert-butyl-p-cresol, benzophenone, alkyl-substituted benzophenones, thiosulfuric acid and salts thereof, and oxalic acid and salts thereof, it being possible to add both the bases and the one or more substances before, during and/or after the emulsion polymerization.

Aqueous polymer dispersions with halogenated monomers incorporated in the polymer have versatile uses as binders, especially where it is important to prevent fire, because films formed from them have a reduced tendency to catch fire.

It is known that the aqueous phase of aqueous polymer dispersions prepared without basic auxiliaries usually has a pH<5, which is a disadvantage for many uses, so that the pH is generally increased by adding bases.

DE-A 2,246,499 discloses that originally white dispersions with vinyl chloride and/or vinylidene chloride incorporated in the polymer become brown on addition of bases, and that this discoloration can be essentially suppressed by addition of small amounts of at least one epoxide. However, the disadvantage of this addition of epoxides is that they also bring about crosslinking of the polymer in the aqueous dispersion.

It is an object of the present invention to provide aqueous polymer dispersions which have halogenated monomers incorporated in the polymer, whose pH is adjusted to from 5 to 10 by addition of bases and which, together with the films formed from them, display essentially no discoloration as a result of the addition of a substance which is not an epoxide and even on prolonged storage.

We have found that this object is achieved by the aqueous polymer dispersions defined in the first paragraph. The substance which is particularly advantageously added is thiosulfuric acid or the salts thereof, especially the alkali metal thiosulfates.

Preferred halogenated monomers are vinyl bromide, vinyl chloride and vinylidene chloride, and of these vinyl chloride and vinylidene chloride are particularly preferred. Examples of suitable comonomers are esters of acrylic or methacrylic acid with aliphatic alcohols containing from 1 to 10 carbon atoms, preferred esters being methyl, ethyl, isopropyl, n-, iso- and tert-butyl, n-hexyl and 2-ethylhexyl esters. Further suitable comonomers are carboxylic acids with $\alpha,\beta$ double bonds such as acrylic and methacrylic acid, vinyl esters of lower alkanecarboxylic acids such as vinyl acetate and vinyl propionate, nitriles of lower carboxylic acids with $\alpha,\beta$ double bonds such as acrylonitrile and methacrylonitrile, and the amides of these acids, acrylic or methacrylic esters with lower polyhydric alcohols, unsaturated sulfonic and phosphonic acids, but also, for example, lower mono- or polyunsaturated hydrocarbons such as ethylene, propene and butadiene. Preferably from 20 to 90% of the total weight of monomers to be polymerized comprises halogenated monomers.

Particularly suitable polymerization initiators are inorganic peroxides such as sodium, potassium or ammonium peroxydisulfate and hydrogen peroxide. Also suitable are azo compounds such as 2,2'-azobisisobutyronitrile and organic peroxides such as dibenzoyl peroxide, t-butyl perpivalate or hydroperoxides such as t-butyl hydroperoxide as well as combined systems composed of at least one organic reducing agent and at least one peroxide and/or hydroperoxide, eg. t-butyl hydroperoxide and sodium hydroxymethanesulfinate, and combined systems which additionally contain a small amount of a metal compound which is soluble in the polymerization medium and whose metallic component is able to occur in several valency states, eg. ascorbic acid/iron(II) sulfate/sodium peroxydisulfate, the ascorbic acid frequently being replaced by sodium hydroxymethanesulfinate, sodium sulfite, sodium bisulfite or sodium metabisulfite.

The amount of polymerization initiator employed for the emulsion polymerization is preferably kept low and is usually from 0.05 to 1%, preferably from 0.1 to 0.3% of the weight of the monomers. Amounts of up to 10% by weight are less preferred.

Emulsifiers which can be used are anionic, cationic or non-ionic, as well as compatible mixtures thereof. They are usually employed in an amount of from 0.05 to 10% of the total weight of the monomers to be polymerized. It is particularly advantageous to use only non-ionic and anionic emulsifiers and mixtures thereof.

Non-ionic emulsifiers which are preferably employed are ethoxylated alkanols (from 2 to 100 EO, $C_8$–$C_{36}$-alkyl), ethoxylated alcohols containing 1 to 4 olefinic double bonds (from 2 to 100 EO, $C_8$–$C_{36}$ chain), ethoxylated mono-, di- or tri-alkylphenols or -naphthols (from 2 to 100 EO, $C_4$–$C_{36}$-alkyl), ethoxylated aliphatic monocarboxylic acids (from 6 to 50 EO, $C_8$–$C_{24}$-alkyl) and ethoxylated monocarboxylic acids containing 1 to 4 olefinic double bonds (from 6 to 50 EO, $C_8$–$C_{24}$-alkyl).

Anionic emulsifiers which are advantageously employed are the alkali metal and ammonium salts of sulfated derivatives of alkanols containing from 6 to 18 carbon atoms, alcohols containing from 6 to 18 carbon atoms and 1 to 4 olefinic double bonds, ethoxylated alkanols (from 4 to 30 EO, $C_{12}$–$C_{18}$-alkyl), ethoxylated alcohols containing 1 to 4 olefinic double bonds (from 4 to 30 EO, $C_{12}$–$C_{18}$-alkyl) and of ethoxylated alkylphenols (from 4 to 30 EO, $C_8$–$C_{14}$-alkyl), the alkali metal and ammonium salts of saturated and unsaturated carboxylic acids ($C_8$–$C_{24}$ chain), the alkali metal and ammonium salts of alkylsulfonic acids containing from 12 to 18 carbon atoms, and the corresponding salts of alkylarylsulfonic acids ($C_{10}$–$C_{18}$-alkyl) and of esters of sulfosuccinic acid with alcohols containing from 4 to 18 carbon atoms.

It is also possible to use protective colloids as surface-active substances together with emulsifiers in the emulsion polymerization. Examples of suitable protective colloids are high molecular weight compounds such as polyvinyl alcohols, polyvinylpyrrolidones, cellulose derivatives, polyacrylamides, polymethacrylamides, polycarboxylic acids or the alkali metal or ammonium salts thereof. It is also possible to use substances to control the molecular weight in the emulsion polymerization.

The emulsion polymerization is usually carried out at from 30° to 90° C. However, dispersions according to the invention which are particularly free of discoloration are obtained when the polymerization is carried out at from 30° to 70° C. The polymerization medium can be composed either of water or of mixtures of water and liquids miscible therewith, such as methanol, but water is preferably used alone. The polymerization can be carried out either as a batch process or as a feed-in process, including a stepwise or gradient procedure. The feed-in process is preferred and entails part of the polymerization mixture being introduced into a vessel and heated to the polymerization temperature, and then the remainder being introduced continuously, stepwise or with a superimposed concentration gradient in separate feed mixtures, one or more of which contains the monomers in pure or emulsified form. The solids content of the resulting aqueous polymer dispersion is generally from 5 to 60% by weight.

Particularly suitable bases for increasing the pH are metal salts of weak acids, eg. alkali metal acetates, formates or carbonates, tertiary amines such as triethylamine, but especially alkali metal and alkaline earth metal hydroxides such as KOH, NaOH and $Ca(OH)_2$, of which $Ca(OH)_2$ is particularly preferred.

Surprisingly, both the aqueous polymer dispersions according to the invention and films formed therefrom display essentially no discoloration even after prolonged storage.

EXAMPLES a) Preparation of initial dispersions D1 to D8 D1

A mixture of 25 kg of water, 0.02 kg of emulsifier I, 0.03 kg of sodium peroxydisulfate ($Na_2S_2O_8$) and 0.0005 kg of iron(II) sulfate heptahydrate ($FeSO_4.7H_2O$) was heated to 50° C., and 5% of feed mixture 1 and 5% of feed mixture 2 were added, and the mixture was maintained at 50° C. for 15 min. Subsequently, while maintaining this temperature, the remaining amount of feed mixture 1 and the remaining amount of feed mixture 2 plus feed mixture 3 were added continuously and synchronously over the course of 3.5 h. This was followed by continuous introduction, likewise at 50° C., of feed mixture 4 over the course of 30 min and feed mixture 5 over the course of 1 h. After-polymerization was then carried out by addition of a mixture of 0.12 kg of a 70% by weight aqueous/alcoholic solution of t-butyl hydroperoxide and 0.05 kg of emulsifier I in 0.35 kg of water and subsequent addition of 0.17 kg of sodium hydroxymethanesulfinate in 0.35 kg of water at room temperature.

| Feed mixture 1: | 55 kg of vinyl chloride |
| --- | --- |
| | 10 kg of vinyl propionate |
| | 35 kg of n-butyl acrylate |
| | 1.7 kg of emulsifier II |
| | 0.78 kg of emulsifier I and |
| | 41 kg of water |
| Feed mixture 2: | 0.003 kg of sodium hydroxymethane-sulfinate |
| | 0.125 kg of sodium acetate and |
| | 14 kg of water |
| Feed mixture 3: | 0.162 kg of sodium peroxydisulfate and |
| | 12 kg of water |
| Feed mixture 4: | 0.048 kg of sodium peroxydisulfate and |
| | 4 kg of water |
| Feed mixture 5: | 0.0018 kg of sodium hydroxymethane-sulfinate |
| | 0.0273 kg of sodium acetate and |
| | 4 kg of water |

Emulsifier I sodium salt of the sulfated derivative of ethoxylated iso-octylphenol (25 EO)

Emulsifier II ethoxylated iso-octylphenol (25 EO)

D2 to D4

As D1 but the emulsion polymerization was carried out not at 50° C. but at 60, 70 and 80° C., respectively.

D5 to D8

As D1 to D4 respectively, but the amount of sodium peroxydisulfate was increased by 50% each time.

b) Addition of bases and substances to the dispersions D1 to D8 and examination for discoloration The pH of the aqueous phase of dispersions D1 to D8 was increased to 8 by addition of ammonia, KOH, NaOH and $Ca(OH)_2$ respectively and then 0.1% by weight, based on the solids content of the aqueous dispersions, of the following substances was added and the discoloration was assessed visually:

Glycerol, pivalic acid, paraldehyde, 2,6-di-tert-butyl-p-cresol, benzophenone, sodium oxalate and sodium thiosulfate.

There was a distinct yellowing when ammonia was used, while there was only a faint yellow tinge when KOH and NaOH were used, and there was no discoloration when $Ca(OH)_2$ was used. The purest white was displayed by the dispersion which contained $Ca(OH)_2$ and sodium thiosulfate. Films were then formed from the dispersions, stored in an oven at 50° C. for 14 days and again assessed visually for discoloration. The results corresponded to those for the liquid state.

We claim:

1. An aqueous polymer dispersion obtained by:

polymerizing a monomer mixture which contains from 10 to 100% by weight of halogenated monomers by radical emulsion polymerization in aqueous medium;

adjusting the pH of the aqueous phase of the resulting aqueous polymer dispersion to from 5 to 10 by addition of bases which differ from ammonia and from primary and secondary amines; and adding from 0.005 to 1% of the weight of the monomer mixture of benzophenone, wherein said bases and said benzophenone are added before, during or after said emulsion polymerization.

2. The polymer dispersion of claim 1, wherein said bases are selected from the group consisting of alkali metal acetates, alkali metal formates, alkali metal carbonates, tertiary amines, alkali metal hydroxides, alkaline earth metal hydroxides and a mixture thereof.

3. The aqueous polymer dispersion of claim 1, wherein said bases are selected from the group consisting of triethylamine, KOH, NaOH, $Ca(OH)_2$ and a mixture thereof.

4. The aqueous polymer dispersion of claim 1, wherein said base is $Ca(OH)_2$.

5. The aqueous polymer dispersion of claim 1, wherein said emulsion polymerization is conducted at a temperature of from 30°–90° C.

6. The aqueous polymer dispersion of claim 1, wherein said emulsion polymerization is conducted at a temperature of from 30°–70° C.

* * * * *